United States Patent [19]

Beauchamp et al.

[11] 4,032,697

[45] June 28, 1977

[54] METHODS OF PRODUCING ELECTRODES FOR ALKALINE BATTERIES

[75] Inventors: Richard Lawrence Beauchamp, Basking Ridge; Dean William Maurer, Berkeley Heights; Thomas Denis O'Sullivan, Summit, all of N.J.

[73] Assignee: Bell Telephone Laboratories, Incorporated, Murray Hill, N.J.

[22] Filed: Nov. 7, 1975

[21] Appl. No.: 630,031

Related U.S. Application Data

[63] Continuation-in-part of Ser. No. 471,674, May 20, 1974, abandoned.

[52] U.S. Cl. ............................. 429/222; 29/623.5; 427/126; 429/245
[51] Int. Cl.² ........................................ H01M 4/26
[58] Field of Search ................ 136/24, 28, 29, 31, 136/75, 76–78, 33; 204/29, 96, 114, 115; 429/222; 29/623.5; 427/126

[56] References Cited

UNITED STATES PATENTS

| 2,007,170 | 7/1935 | Bacsa | 136/28 |
| 2,952,570 | 9/1960 | Heuninckx | 136/24 X |
| 3,284,237 | 11/1967 | Lambert et al. | 136/24 |
| 3,356,534 | 12/1967 | Ackermann | 136/24 X |
| 3,573,101 | 3/1971 | Beauchamp | 136/76 |
| 3,679,481 | 7/1972 | Pinard | 136/24 |

Primary Examiner—Anthony Skapars
Attorney, Agent, or Firm—Walter G. Nilsen

[57] ABSTRACT

A process is described for making alkaline batteries in which particular attention is given to the pretreatment of nickel plaques prior to impregnation. This pretreatment involves production of a uniform thin oxide film on the nickel plaque surface under carefully controlled conditions. This pretreatment prevents corrosion under conditions for commercial production of electrodes for alkaline batteries and permits not only higher loadings but more uniform loadings of the electrodes.

13 Claims, 3 Drawing Figures

METHODS OF PRODUCING ELECTRODES FOR ALKALINE BATTERIES

CROSS REFERENCE TO RELATED APPLICATION

This application is a continuation-in-part of a copending application, Ser. No. 471,674, filed May 20, 1974, now abandoned.

BACKGROUND OF THE INVENTION

1. Field of the Invention

The invention relates to methods of manufacturing alkaline batteries and more particularly to treatment of nickel plaques prior to impregnation and to the resultant product, and to cells containing the product.

2. Description of the Prior Art

A commercially established approach to the production of electrodes for alkaline batteries is to impregnate a porous supporting electrode structure (i.e., a porous nickel plaque) with finely divided active material so as to present a high surface area of a substantial amount of active material to the electrolyte. While loadings obtained in this way are quite satisfactory, higher loadings are desirable and reduced time required for loading is economically advantageous.

A number of impregnation procedures have been used in the past. Particularly simple was the procedure of soaking the porous plaque in a salt solution and evaporating the liquid. This was followed by soaking the plaque in a second solution to convert the soluble salt to an insoluble active form. Soaking in either the first or second solution, or both might be repeated several times to increase loading. Thermal decomposition is also used to convert to the insoluble active form. These procedures are referred to as chemical impregnation processes.

An alternative approach over these soaking processes is electrolytic impregnation (see L. Kandler U.S. Pat. No. 3,214,355 issued Oct. 26, 1965). In this process, active material is continuously deposited directly in the pores of the plaque. Here, the impregnation is carried out in an acid electrolyte containing cations of the active material and reducible ions, the redox potential of which is more positive than that of the cations of the active material. In the electrolysis process, the nickel plaque is made the cathode and cations as well as reducible ions (for example nitrate ions) migrate into the pores of the plaque. However, only the reducible ions are reduced because of their more positive potential and during their reduction, hydrogen ions are consumed. This results in precipitation of the cations in the form of active material. This method is a further improvement on previous methods and is adaptable to mass production.

Loading levels could be increased somewhat by repeated electrolytic impregnation and overnight drying between each impregnation. However, this process modification increases manufacturing time. More rapid impregnation could be achieved by increasing the temperature of the electrolyte as described in R. L. Beauchamp U.S. Pat. No. 3,573,101, issued Mar. 30, 1971 and U.S. Pat. No. 3,653,967, issued Apr. 4, 1972. However, attempts to further reduce time of impregnation at such increased temperature by increasing current density results in deposition on the surface of the plaque preventing further impregnation in interior pores. Attempts to achieve higher loadings, as for example, by continued electrolytic impregnation, led either to accumulation on the outside surface of the plaque or to reduction in the percent utility of active material or both. Active material accumulating on the outside surface of the plaque separates during battery operation and does not contribute to the capacity of the electrode.

One of the things that limits the loading and percent utilization of the loading is corrosion caused by exposure of the nickel plaque to the acidic electrolyte. This is particularly serious in commercial manufacturing processes because of the necessity in automatic electrolytic loading apparatus to expose the nickel plaque to the acidic electrolyte for a considerable amount of time. High acidity of the electrolyte is required to prevent premature precipitation of the active cations before they migrate into the pores of the plaque. However, corrosion produces nickel ions, which not only compete for space in the pores with the active cations, but also complete in the electrolytic battery operation. Also, the problem is more serious for the negative electrode on an alkaline battery since nickel ions actively contribute to the capacity of the positive electrode of an alkaline battery but subtract from the negative electrode capacity. Corrosion has other undesirable effects on alkaline battery electrodes, as for example, the structural weakening of the plaque itself and the deposit of large crystals in the pores of the nickel plaque which prevents the usual increase in capacity on recycling.

SUMMARY OF THE INVENTION

The invention is a process for the manufacture of alkaline batteries in which the plaques used for the electrodes are subjected to a specific pretreatment procedure prior to impregnation. This pretreatment is carried out under carefully controlled conditions so as to produce on the nickel plaque a passivating layer which is uniform in thickness and sufficiently thick to prevent corrosion under the conditions of electrolytic impregnation. However, the thickness of the passivating layer is limited so as to avoid reduction in electrode capacity. The pretreatment procedure involves the production of an oxide layer. A procedure is described for adjusting the parameters of the oxidation procedure (reaction time, temperature, etc.) so as to obtain adequate protection against corrosion under conditions (pH, temperature, time, etc.) used later in the impregnation. Controlled plaque oxidation permits greater variation in the operating parameters of the impregnation procedure (as, for example, lower bath pH and longer exposure time of the plaque to the impregnation bath) and leads to higher and more uniform impregnation under commercial manufacturing conditions. Particular benefits accrue from use of the inventive procedure where continuous electrolytic impregnation procedures are used since the plaque must suffer exposure to the acid electrolyte for a longer time before the beginning of electrolysis than in a batch process. Controlled plaque oxidation also improves the surface condition of the plaque possibly by removing organic matter, such as tars and oil, so as to improve the wettability of the plaque surface and improve the electrical contact between the plaque and the active material used to impregnate the plaque. Various pretreatment procedures may be used to produce the oxide layer including, for example, reaction with aqueous peroxide solution. Anodic oxidation and air oxidation at elevated temperatures are preferred because these meth-

DETAILED DESCRIPTION

1. Procedure for the Pretreatment

Figure 1:
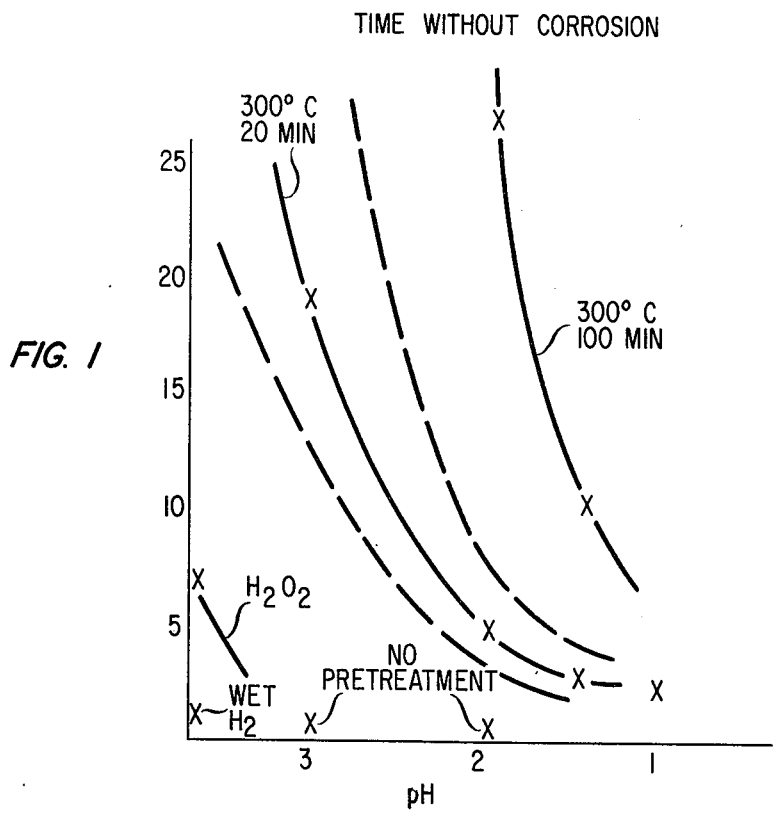
FIG. 1 is a graph with several curves showing, on coordinates of time before beginning of corrosion in minutes vs. pH of the impregnation bath, the relationship between time before the beginning of corrosion for various bath pH's in boiling impregnation bath for several pretreatment procedures.

The invention involves a pretreatment procedure which results in an oxide protective coating on the nickel plaque surface of sufficient thickness to insure protection from corrosion in the impregnation bath under conditions used in electrolytic or chemical impregnation. These conditions involve, among other parameters, temperature and pH of the impregnation bath and time that the plaque is exposed to the bath during impregnation. Nickel plaques are useful in a variety of batteries including nickel-cadmium batteries, silver-zinc batteries, silver-cadmium batteries, nickel zinc batteries, mercury-zinc batteries, mercury-cadmium, etc. One or both electrodes of the battery may use a nickel plaque. The pretreatment procedure is used where the nickel plaque is exposed to acid solution during battery fabrication. In particular, it is used prior to electrolytic or chemical impregnation where the impregnation bath is acidic.

In chemical impregnation procedures the nickel plaque is wetted by an acidic solution of the cation which forms the active material in the electrode. For example, cadmium nitrate would be used for a cadmium electrode. Usually the plaque is then washed to remove surface cations. Then the cations are precipitated chemically either by wetting the plaque with an alkaline solution or thermally decomposing the cation compound.

Oxidation of the plaque may be carried out in a variety of ways including reaction in a peroxide water solution, electrolytic anodic oxidation and air oxidation. Conditions of the oxidation reaction such as temperature, pH, etc., may be varied over wide limits so as to produce an oxide coating of sufficient thickness to prevent corrosion during the impregnation. The pretreatment procedure is particularly advantageous where electrolytic impregnation is used since the bath in this type of impregnation procedure must be highly acidic.

For pretreatment in aqueous peroxide solution, pH of the solution may vary from one to eleven and reaction temperature from the freezing point to the boiling point of the solution. Outside the pH range given above there is no improvement and requires additional reagents. Carrying out the reaction above the boiling point is inconvenient and below the freezing point the reaction is too slow for practical application. Peroxide concentration may vary from 1 to 50 weight percent. Below one weight percent, the reaction is too slow for convenience, above 50 weight percent the solution is unstable.

Typical results for pretreatment using peroxide are shown in Table 1. Here, the nickel plaque was immersed in an aqueous hydrogen peroxide solution for 20 minutes at 80° C. The solutions labeled in Table 1 as pH 1-2, 4-5, and 10-11 were made as follows:

For pH 1-2 solution, an 88 wt percent aqueous formic acid was added to 5 wt percent aqueous peroxide until the pH of the solution was between 1 and 2. The pH 4-5 solution was 5 wt percent aqueous peroxide. The pH 10-11 solution was made by adding aqueous ammonia (28 wt percent) to 5 wt percent peroxide until the pH was in the range 10-11. The plaques were then washed, dried and electrolytically impregnated with cadmium. No attempt was made to maximize impregnation but rather the impregnation was carried out under identical conditions to facilitate comparison. Capacity was estimated in two ways. Theoretical capacity was determined from the gain in weight due to the electrolytic impregnation. Measured capacity was determined by actual discharge of the electrode to about 80 percent of the electrode voltage after cycling of the electrode.

Table 1

| pH | Peroxide Pretreatment Capacity [ma hr/in$^2$] | |
|---|---|---|
| | Theoretical | Measured |
| 1-2 | 189 | 143 |
| 4-5 | 212 | 165 |
| 10-11 | 239 | 190 |
| No Pretreatment | 172 | 130 |

As can be seen from Table 1, pretreatment improves the capacity substantially.

Anodic oxidation and air oxidation are preferred because of larger loadings obtained. Anodic oxidation is carried out in an aqueous basic solution preferably made basic with a strong base (basicity constant greater than 0.1). Typical strong bases are sodium hydroxide and potassium hydroxide. Concentration of base should preferably be in the range of 0.1 M to 10 M. Temperature reaction may vary from the freezing point of the electrolyte to the boiling point of the electrolyte. The preferred temperature range is 50°–100° C because reaction is rapid in this range without the inconvenience of boiling electrolyte. Current density is between 0.05 and 10 Amp/in$^2$. Below 0.05 Amp/in$^2$, the reaction is inconveniently slow; above 10 Amp/in$^2$, the reaction is difficult to control as far as obtaining optimum thickness of the oxide layer. Time of reaction may vary from 1 minute to three hours with 10–40 minutes preferred for convenience.

Typical results are contained in Table 2.

Table 2

| Molarity | Temp. | Time | Capacity [ma hr/in$^2$] | |
|---|---|---|---|---|
| | | | Theoretical | Measured |
| 5.0 | 80° C | 20 min. | 253 | 194 |
| 1.2 | 80° C | 20 min. | 257 | 199 |
| 1.2 | 60° C | 30 min. | 270 | 223 |

Aqueous sodium hydroxide was used as the electrolyte and the anodic oxidation was carried out at the elevated temperatures indicated in Table 2 with a current density of approximately ½ amp./in.$^2$. As can be seen from the table, anodic oxidation leads to higher theoretical and measured loadings as compared to peroxide pretreatment.

Air oxidation is preferred over anodic oxidation in continuous manufacturing situations because of the ease of carrying out this procedure and the high capacity obtained. Air oxidation is carried out by merely heating the nickel plaque to a temperature range between 200° C and 500° C for times varying between 1 minute and 5 hours. At temperatures below 200° C the oxidation reaction is inconveniently slow and no advantages are obtained from slow oxidation. Above 500° C the oxidation reaction is quite rapid and difficult to control. Typical results were obtained at 350° C for 30 minutes. Under these conditions theoretical capacity was 270 ma hr/in$^2$ and measured capacity was 223 ma hr/in$^2$. These results were the same as those obtained in anodic oxidation under the most favorable conditions. However, as pointed out above, air oxidation is often more convenient especially for continuous electrolytic impregnation of nickel plaques.

Prior to air oxidation, it is sometimes advantageous to wet or soak the nickel plaque in a liquid. Water or an aqueous solution is preferred because of cost. This has a cleaning effect of plaques containing foreign or organic matter and improves the adherence of the passivating film to the nickel plaque. The origin of this matter in the plaques is often organic and inorganic remnants from the binder in the sintering process for making the nickel plaque. The plaque may be sprayed with the water or aqueous solution or the plaque may be immersed in the water or aqueous solution. The temperature of the solution or water may vary from its freezing point to its boiling point but a temperature between 40° C and boiling is preferred. The plaque may be immersed in the water-containing solution for various amounts of time, longer where the plaque contains more contaminant and less where the solution is heated but times beyond 30 minutes are generally not required. Where extensive cleaning action is not required, it may be preferred to carry out the air oxidation in a high humidity atmosphere [above 30 percent relative humidity in the temperature range between 200 and 500° C]. Apparently as the cool plaque first enters the air oxidation chamber, water condenses on the plaque. Water-containing solution includes aqueous solution and water.

After impregnation, the electrodes are formed (cycled one or more times to remove unwanted ions in the nickel plaque and active material from the surface of the plaque) and then assembled in well-known ways. The assembled battery is charged before use.

2. Optimization of Air Oxidation Procedure

Particularly important in obtaining maximum capacity of electrodes for use in alkaline batteries is obtaining an oxide layer sufficiently thick to prevent corrosion but not excessively thick to reduce electrode capacity. The exact conditions of oxidation which result in maximum loadings of the nickel plaques depend on the conditions of electrolytic impregnation such as time of exposure, pH, and temperature of the bath, etc. and on the surface condition of the nickel plaque.

To optimize the oxidation procedure the plaque is first oxidized under a given set of conditions and then the plaque is immersed in the impregnation bath without connecting it to the electrical circuitry. The pH and temperature of the impregnation bath are maintained at the temperature used for electrolytic impregnation. The time is then measured to the outset of corrosion of the nickel plaque. Corrosion is indicated in several ways. One way is the abrupt change in the potential of the nickel plaque as measured against a platinum counter electrode. Another way is the appearance of green color due to the dissolution of nickel ions. These experiments are carried out using different conditions and times of air oxidation.

Typical results are shown in FIG. 1. Where no pretreatment is used or wet hydrogen is used to remove any oxide layer, corrosion appears after a very short time. Pretreatment with aqueous peroxide increases the time before the outset of corrosion. However, best results are obtained using air oxidation. Using curves such as that shown in FIG. 1, an optimum procedure for air oxidation can be obtained given the pH and the temperature of the impregnation bath. Generally, the plaque should withstand corrosion from between 20 percent and 200 percent of the time the plaque is exposed to the impregnation bath. Typically approximately 100 percent of the time gives optimum results. Also a new determination of time before corrosion versus bath pH should be made for nickel plaques obtained from different sources.

3. Alkaline Batteries Produced by the Inventive Process

Figure 2:
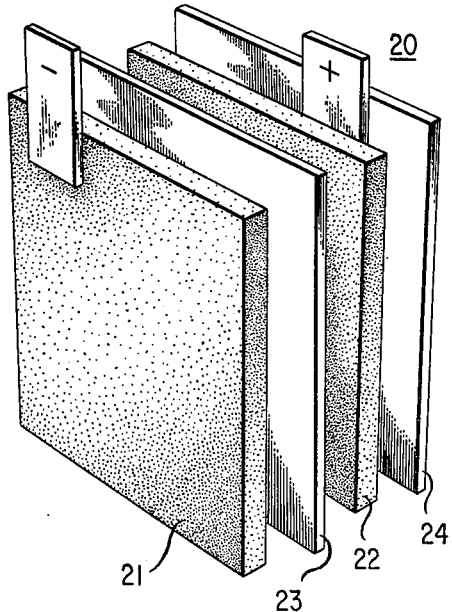
FIG. 2 shows in perspective view components of an alkaline battery containing an electrode made in accordance with the invention.

FIG. 2 shows several components of a typical alkaline battery 20, namely, a nickel cadmium battery. The negative electrode 21 is a cadmium electrode made in accordance with the invention. The positive electrode 22 is a nickel electrode also made in accordance with the invention. Also shown are separators 23 and 24 used to electrically insulate the negative electrode from the positive electrode. Here the separators are made from micro-porous polymeric material. A multiplicity of such positive electrodes and negative electrodes may be assembled so as to make up a completed battery. The electrolyte in this particular battery is a 30% by weight KOH in water. In fabricating such a battery the individual electrodes are usually formed (electrolytically cycling the electrodes several times) and then assembled in the discharged condition. On charging the battery becomes ready for use.

Figure 3:
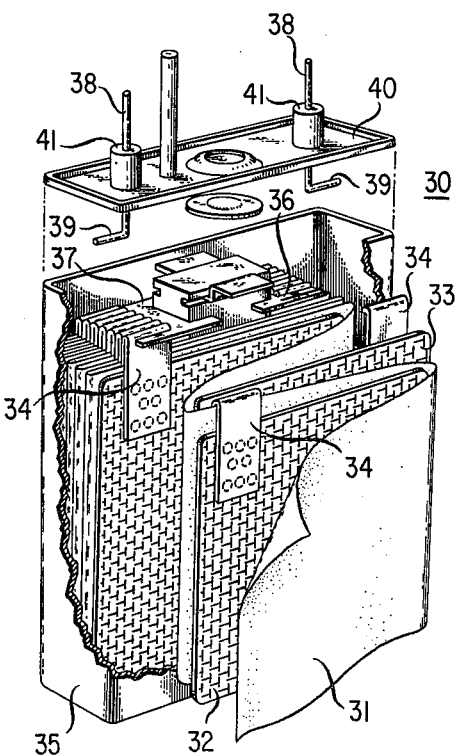
FIG. 3 shows in perspective view partly in section of a nickel-cadmium battery employing multiple positive and negative electrodes made in accordance with the invention.

A more detailed drawing of a battery is shown in FIG. 3. This figure shows a partially assembled sealed nickel cadmium battery 30. The battery is made up of a separator 31, and a negative electrode 32 which is impregnated with cadmium and made in accordance with the invention. Also shown is a positive electrode 33 impregnated with nickel together with metal tabs 34 and outer battery container 35. The metal tabs are connected together by a core structure having negative 36 and positive 37 electrodes. An electrical connection is made to battery posts 38 by means of metal strip 39. The metal posts are connected to the cover plate 40 by means of a compression seal 41.

What is claimed is:

1. A process for the fabrication of cadmium electrodes for batteries in which the cadmium electrodes are made by impregnating a nickel plaque by a series of steps comprising
   a. wetting the porous nickel plaque in a solution which contains cadmium cations with the solution having an acidic pH, b. precipitating the cadmium ions in the form of a cadmium-ion compound from the solution in the porous nickel plaque characterized in that prior to impregnating the nickel plaque, the nickel plaque is first wetted with a water-containing solution and then air-oxidized in the temperature range between 200° and 500° C for a time period between 1 minute and 5 hours so as to passivate the nickel plaque against acidic attack during impregnation.

2. The process of claim 1 in which the precipitation is carried out by electrolysis.

3. The process of claim 1 in which the precipitation is carried out chemically.

4. The process of claim 3 in which the chemical precipitation is carried out by wetting the plaque with an alkaline solution.

5. The process of claim 3 in which the chemical precipitation is carried out by thermal decomposition.

6. The process of claim 1 in which the battery is a nickel-cadmium battery.

7. The process of claim 1 in which a continuous process is used for electrolytic impregnation.

8. The process of claim 1 in which a batch process is used for electrolytic impregnation.

9. The product produced by the process of claim 1.

10. A battery containing an electrode produced by the process of claim 1.

11. The battery of claim 1 in which the electrode is a cadmium electrode.

12. The process of claim 1 in which the nickel plaque is wetted by immersing in a water-containing solution with temperature between the boiling and freezing point of the solution.

13. The process of claim 12 in which the nickel plaque is immersed in the water-containing solution for a time period of up to 30 minutes and the temperature of the water-containing solution is between 40° C and the boiling temperature of the solution.

* * * * *